United States Patent [19]
Omae et al.

[11] 4,436,554
[45] Mar. 13, 1984

[54] HIGH STRENGTH AND HIGH TOUGHNESS WELDING MATERIAL

[75] Inventors: Takashi Omae; Kisaburoo Tanaka; Masahiro Aoki; Fumitoshi Hirayama; Susumu Izaki, all of Hiroshima, Japan

[73] Assignee: Mitsubishi Jukogyo Kabushiki Kaisha, Tokyo, Japan

[21] Appl. No.: 437,886

[22] Filed: Oct. 29, 1982

[30] Foreign Application Priority Data

Nov. 18, 1981 [JP] Japan .................................. 56-183722

[51] Int. Cl.$^3$ ............................................. C22C 38/44
[52] U.S. Cl. ................................ 75/128 T; 75/128 W; 75/125; 219/146.41; 228/263.15; 148/37; 428/682

[58] Field of Search ............. 75/128 R, 128 A, 128 T, 75/128 W, 125; 148/37, 31.5; 219/146.41, 146.23; 228/263.15; 428/682, 683, 685

[56] References Cited

U.S. PATENT DOCUMENTS 3,290,128 12/1966 Manganello et al. ............. 75/128 T
3,656,943 4/1972 Heuschkel ....................... 75/128 W
3,759,706 9/1973 Mravic et al. .................... 75/128 W Primary Examiner—L. Dewayne Rutledge
Assistant Examiner—Debbie Yee
Attorney, Agent, or Firm—Wenderoth, Lind & Ponack

[57] ABSTRACT

A high strength and high toughness welding material containing: C: 0.05–0.15%, Si: 0.25–0.70%, Mn: 0.60–1.80%, Ni: 4.5–11.0%, Cr: 0.20–1.20%, Mo: 0.20–0.60%, Ti: 0.03–0.12%, Cr+Mo: from 0.40% to $0.030\times(Ni\%)^2$ by weight and the balance essentially iron.

1 Claim, No Drawings

HIGH STRENGTH AND HIGH TOUGHNESS WELDING MATERIAL

BACKGROUND OF THE INVENTION

Examples of conventional welding materials for use at temperatures as low as −90° C. are 3.5% nickel alloy steel and austenite stainless steel.

Welds with these materials, however, offer low yield strengths of 30-55 Kgf/cm², although they are durable at low temperatures, which precludes their use for rotary high-speed machinery which requires materials that can be used as welding materials in strong and durable states at low temperatures. Additional heat treatment —quenching and tempering do not raise yield strength and impact value, VE —90 to permit such welds being used in parts subject to high r.p.m.

SUMMARY OF THE INVENTION

The present invention relates to a welding material, hereinafter referred to as welding wire, and more particularly to a welding material which may be used at temperatures as low as −90° C. for a variety of welds of various machinery and tools. The welding material according to the present invention offers great strength durability, even when it is used in welds at −90° C.

DETAILED DESCRIPTION OF THE INVENTION

The inventors have developed a welding material that is stronger and more durable than conventional welds at −90° C., and have determined that (1) Increased Ni content in steel increases durability at low temperatures.

(2) Addition of Cr and Mo increases the efficiency of the quenching and tempering steps.

(3) The Cr + MO content are critical factors in achieving strength and durability.

The present invention is based on the above findings and provides a strong - durable welding material characterized by containing the following elements in weight percentage listed below. Hereinafter, the percentage is by weight. C: 0.05 −0.15%, Si: 0.25 −0.70%, Mn: 0.60 −1.80%, Ni: 4.5 −11.0%, Cr: 0.20 −1.20%, Mo: 0.20 −0.60%, Ti: 0.03 −0.12% and Cr + Mo: from 0.40% to 0.030 ×(Ni%)², and the impurities, P and S, that are unavoidable are limited to less than 0.010% and Cu less than 0.20%, and Sn, Sb and As less than 0.010%, and oxygen and nitrogen less than 100 ppm and the balance iron.

The reasons for specifying the amount of the component elements in the welding material according to the present invention are as follows.

Carbon is needed for raising the weld strength. For the reasons that proper strength can not be obtained if it is too low, and that cracks at high temperatures in the weldment are liable to develop if it is too low, it is in the range from 0.05 −0.15%.

Silicon has a refining effect on the weld metal. If silicon is too low, the refining effect is not enough, and if it is too high, low temperature durability is reduced during quenching and tempering. For those reasons, silicon of 0.25 −0.70% is used.

Mn has the same effect as silicon. For the same reasons as for silicon, manganese of 0.60 −1.80% if employed.

Ni raises the low temperature durability and strength. If it is below 4.5%, low temperature durability at −90° C. is insufficient in the weld metal that is subjected to quenching and tempering to obtain a yield strength of from 75 −100 Kgf/mm². If Ni content is higher than 11%, the cost is no longer practical. The Ni content is therefore limited to the range of 4.5 −11%.

Cr improves quenching, but its characteristics tend to reduced low temperature durability. The range of 0.20 −1.20% is considered to be preferable. If the content is lower than 0.20, the yield strength is low. If the content exceeds 1.20%, durability at −90° C. is reduced.

Mo also improves the quenching characteristics, and it also maintains strength after tempering. A range of 0.20 −0.60% is recommended. If the Mo content is below 0.20%, the yield strength is low, and a content of over 0.60% offers no improved yield strength, only raising the alloy cost.

As for the above-mentioned chromium and molybdenum, if the total of both elements is increased, strength of the weld metal is increased, but low temperature durability is decreased. To meet both the strength and low temperature durability requirements, it is important that the total of both elements fall between 0.40% and $0.30 \times (Ni\%)^2 (0.40\% \leq Cr + Mo \leq 0.030 \times (Ni\%)^2)$.

Titanium is an important element for achieving stability in metallurgical reactions and in the arc during welding. If it is lower than 0.03% in weight, its deoxidizing effect and contribution to arc stability will not be evident, and if it is over 0.12% in weight, it lessens arc stability and durability of the weld metal, its content is limited in the range of 0.03 −0.12%.

The unavoidable impurities, P, and S and Cu are likely to cause cracks to develop in the weld. It is therefore desirable to limit P and S contents to less than 0.010%, and Cu under 0.20%. Other impurities, Sn, Sb and As should be limited to less than 0.010%. Since oxygen and nitrogen reduce durability, content of each gas should be less than 100 ppm.

Welding materials that are examples of the present invention with the above listed compositions are used as welding rods for gas-sealed arc welding, and the weld metals are subjected after welding to quenching and tempering.

Next, two examples of the present invention are presented below for detailed explanation of the present invention.

EXAMPLE 1

Welding wires of a diameter of 1.20 φ with the chemical compositions of Table 1 were used for gas-sealed arc welding of a mild steel plate (16 mm thick ×300 mm wide ×700 mm long) (battered with the specimen wires) with 200-240 A electric current, 25-27 V voltage, and a welding speed of 25-30 cm/min, and (argon+20% O₂) for sealed-gas, and the weld was quenched at 860° C. ±25° C. The yield strength of the weld metal was determined by a tensile strength test at room temperature and the low temperature durability was determined by an impact test at −90° C. The results of the test are shown in Table 2. It is evident from Tables 1 and 2 that after quenching and tempering, a yield strength from 75 −100 Kgf/mm² can be obtained and sufficient low temperature durability over 28 kg/mm² at −90° C. is also obtainable.

Table 3 lists the chemical composition of the weld metals obtained from the welding wires of Table 1. Oxygen included in the weld metals was from 200 −500 ppm, and nitrogen from 10 −50 ppm.

TABLE 1

(weight %)
Chemical Component

| No. | | C | Si | Mn | P | S | Ni | Cr | Mo | Cu | Sn | Sb | As | Ti |
|---|---|---|---|---|---|---|---|---|---|---|---|---|---|---|
| 1 | Other than present invention | 0.07 | 0.41 | 1.53 | 0.003 | 0.006 | 2.8 | 0.7 | 0.7 | 0.17 | 0.002 | 0.006 | 0.001 | 0.04 |
| 2 | " | 0.03 | 0.38 | 1.30 | 0.008 | 0.008 | 4.52 | 0.10 | 0.30 | 0.18 | 0.003 | 0.008 | 0.002 | 0.08 |
| 3 | Present invention | 0.07 | 0.45 | 1.25 | 0.006 | 0.003 | 4.53 | 0.25 | 0.25 | 0.15 | 0.004 | 0.008 | 0.001 | 0.07 |
| 4 | " | 0.10 | 0.42 | 1.00 | 0.008 | 0.006 | 4.60 | 0.30 | 0.30 | 0.15 | 0.004 | 0.005 | 0.001 | 0.03 |
| 5 | Other than present invention | 0.07 | 0.45 | 1.20 | 0.006 | 0.003 | 4.53 | 0.70 | 0.5 | 0.12 | 0.002 | 0.004 | 0.001 | 0.05 |
| 6 | " | 0.06 | 0.35 | 0.90 | 0.005 | 0.002 | 6.48 | 0.20 | 0.10 | 0.13 | 0.002 | 0.003 | 0.002 | 0.06 |
| 7 | Present invention | 0.08 | 0.48 | 1.22 | 0.004 | 0.003 | 6.52 | 0.25 | 0.32 | 0.12 | 0.003 | 0.004 | 0.001 | 0.06 |
| 8 | " | 0.10 | 0.47 | 0.95 | 0.005 | 0.004 | 6.48 | 0.82 | 0.40 | 0.14 | 0.003 | 0.005 | 0.002 | 0.09 |
| 9 | Other than present invention | 0.10 | 0.45 | 1.20 | 0.006 | 0.002 | 6.4 | 1.26 | 0.50 | 0.12 | 0.002 | 0.004 | 0.001 | 0.06 |
| 10 | " | 0.08 | 0.38 | 0.95 | 0.003 | 0.004 | 8.5 | 0.11 | 0.21 | 0.12 | 0.003 | 0.005 | 0.001 | 0.07 |
| 11 | Present invention | 0.10 | 0.38 | 1.20 | 0.005 | 0.004 | 8.5 | 0.36 | 0.22 | 0.14 | 0.001 | 0.005 | 0.002 | 0.12 |
| 12 | " | 0.12 | 0.32 | 1.12 | 0.008 | 0.006 | 8.4 | 0.84 | 0.48 | 0.16 | 0.001 | 0.005 | 0.001 | 0.05 |
| 13 | " | 0.09 | 0.36 | 1.24 | 0.004 | 0.003 | 8.5 | 1.20 | 0.58 | 0.15 | 0.002 | 0.007 | 0.002 | 0.07 |
| 14 | Other than present invention | 0.09 | 0.35 | 1.10 | 0.005 | 0.004 | 8.5 | 1.30 | 0.65 | 0.16 | 0.002 | 0.007 | 0.001 | 0.10 |
| 15 | " | 0.03 | 0.34 | 1.09 | 0.004 | 0.003 | 10.6 | 0.02 | 0.05 | 0.08 | 0.001 | 0.003 | 0.001 | 0.09 |
| 16 | Present invention | 0.07 | 0.39 | 1.20 | 0.003 | 0.003 | 10.6 | 0.31 | 0.30 | 0.12 | 0.002 | 0.004 | 0.001 | 0.10 |
| 17 | " | 0.10 | 0.40 | 1.22 | 0.002 | 0.005 | 10.7 | 1.05 | 0.49 | 0.14 | 0.001 | 0.001 | 0.000 | 0.10 |
| 18 | Other than present invention | 0.06 | 0.40 | 1.25 | 0.004 | 0.002 | 10.5 | 1.50 | 0.38 | 0.09 | 0.001 | 0.003 | 0.001 | 0.08 |

TABLE 2

| No. | Yield strength (Kgf/mm²) | Absorbed Energy VE-90 (Kgf·m) |
|---|---|---|
| 1 | 96 | 0.7 |
| 2 | 54 | 6.1 |
| 3 | 75 | 4.0 |
| 4 | 85 | 3.2 |
| 5 | 97 | 1.9 |
| 6 | 65 | 5.0 |
| 7 | 97 | 3.8 |
| 8 | 98 | 3.2 |
| 9 | 99 | 2.0 |
| 10 | 68 | 5.5 |
| 11 | 97 | 4.2 |
| 12 | 98 | 3.8 |
| 13 | 98 | 2.9 |
| 14 | 98 | 2.0 |
| 15 | 65 | 9.5 |
| 16 | 96 | 5.4 |
| 17 | 98 | 3.8 |
| 18 | 100 | 2.0 |

| | |
|---|---|
| Tungsten diameter | 3.2 φ |
| Wire diameter | 1.2 φ |
| Wires used are No. 6, 7, 8 and 9 of Table 1 of embodiment 1 | |
| TIG current | 260–280 A |
| TIG voltage | 12 V |
| Welding speed | 200 mm/min |
| Wire feeding speed | 1000 mm/min |
| Sealed-gas | Ar. 25% + He 75% |
| Flow rate of sealed-gas | 30 l/min |

Yield strengths of the weld metals produced by the above TIG welding after quenching and tempering as in Example 1 were obtained by a room temperature tensile strength test and their low temperature durability by an impact test at −90° C. Table 4 shows the results.

It is evident from Table 4 that with the welding materials of the present invention, yield strength and low temperature durability that are about the same as in Example 1 can be obtained.

TABLE 3

(Weight %)

| No. | | C | Si | Mn | P | S | Ni | Cr | Mo | Cu | Sn | Sb | As | Ti |
|---|---|---|---|---|---|---|---|---|---|---|---|---|---|---|
| 1 | Other than present invention | 0.07 | 0.35 | 1.17 | 0.001 | 0.006 | 2.66 | 63 | 0.49 | 0.16 | 0.001 | 0.003 | 0.001 | 0.02 |
| 2 | " | 0.04 | 0.25 | 1.22 | 0.002 | 0.003 | 4.50 | 0.08 | 0.30 | 0.15 | 0.002 | 0.005 | 0.001 | 0.02 |
| 3 | Present invention | 0.07 | 0.30 | 1.00 | 0.005 | 0.003 | 4.51 | 0.24 | 0.22 | 0.15 | 0.003 | 0.005 | 0.001 | 0.03 |
| 4 | " | 0.12 | 0.35 | 0.98 | 0.006 | 0.004 | 4.55 | 0.28 | 0.30 | 0.14 | 0.003 | 0.005 | 0.001 | 0.01 |
| 5 | Other than present invention | 0.08 | 0.30 | 0.99 | 0.003 | 0.005 | 4.52 | 0.70 | 0.49 | 0.12 | 0.002 | 0.004 | 0.001 | 0.01 |
| 6 | " | 0.06 | 0.32 | 0.88 | 0.005 | 0.002 | 6.40 | 0.19 | 0.10 | 0.13 | 0.001 | 0.003 | 0.001 | 0.02 |
| 7 | Present invention | 0.08 | 0.40 | 0.99 | 0.004 | 0.002 | 6.48 | 0.24 | 0.31 | 0.12 | 0.002 | 0.004 | 0.001 | 0.01 |
| 8 | " | 0.09 | 0.40 | 0.90 | 0.005 | 0.004 | 6.43 | 0.80 | 0.40 | 0.14 | 0.002 | 0.005 | 0.001 | 0.02 |
| 9 | Other than present invention | 0.10 | 0.43 | 1.10 | 0.006 | 0.002 | 6.40 | 1.26 | 0.50 | 0.12 | 0.001 | 0.004 | 0.001 | 0.02 |
| 10 | " | 0.08 | 0.35 | 0.90 | 0.003 | 0.004 | 8.5 | 0.11 | 0.22 | 0.12 | 0.002 | 0.005 | 0.001 | 0.01 |
| 11 | Present invention | 0.07 | 0.30 | 0.99 | 0.003 | 0.005 | 8.6 | 0.35 | 0.22 | 0.12 | 0.002 | 0.001 | 0.001 | 0.03 |
| 12 | " | 0.12 | 0.30 | 1.05 | 0.005 | 0.003 | 8.4 | 0.82 | 0.49 | 0.14 | 0.005 | 0.002 | 0.001 | 0.01 |
| 13 | " | 0.10 | 0.36 | 1.12 | 0.004 | 0.003 | 8.5 | 1.15 | 0.59 | 0.15 | 0.001 | 0.005 | 0.001 | 0.01 |
| 14 | Other than present invention | 0.09 | 0.32 | 1.02 | 0.005 | 0.003 | 8.45 | 1.28 | 0.66 | 0.15 | 0.001 | 0.006 | 0.001 | 0.02 |
| 15 | " | 0.03 | 0.30 | 0.85 | 0.003 | 0.002 | 10.8 | 0.01 | 0.05 | 0.09 | 0.001 | 0.003 | 0.001 | 0.02 |
| 16 | Present invention | 0.06 | 0.29 | 0.95 | 0.005 | 0.003 | 10.5 | 0.30 | 0.30 | 0.12 | 0.002 | 0.004 | 0.001 | 0.02 |
| 17 | " | 0.09 | 0.30 | 1.02 | 0.002 | 0.005 | 10.8 | 1.00 | 0.48 | 0.13 | 0.001 | 0.001 | 0.000 | 0.02 |
| 18 | Other than present invention | 0.06 | 0.30 | 0.99 | 0.004 | 0.002 | 10.5 | 1.50 | 0.38 | 0.09 | 0.001 | 0.003 | 0.001 | 0.02 |

EXAMPLE 2

TIG welding was applied to a mild steel plate (16 mm thick ×300 mm wide ×700 mm long) under the welding conditions below:

The chemical composition of those weld metals in Example 2 are shown in Table 5.

TABLE 4

| No. | Yield strength (Kgf/mm²) | Absorbed Energy VE - 90 (Kgf · m) |
|---|---|---|
| 6 | 66 | 6.0 |
| 7 | 96 | 4.0 |
| 8 | 98 | 3.8 |
| 9 | 99 | 2.2 |

TABLE 5

| | | (Weight %) Chemical Compostion | | | | | | | | | | | | | |
|---|---|---|---|---|---|---|---|---|---|---|---|---|---|---|---|
| No. | Remark | C | Si | Mn | P | S | Ni | Cr | Mo | Cu | Sn | Sb | As | Ti | O₂ | N₂ |
| 6 | Other than present invention | 0.06 | 0.33 | 0.85 | 0.004 | 0.002 | 6.49 | 0.20 | 0.11 | 0.13 | 0.002 | 0.003 | 0.002 | 0.03 | 0.0045 | 0.0026 |
| 7 | Present invention | 0.08 | 0.45 | 1.15 | 0.003 | 0.003 | 6.52 | 0.24 | 0.32 | 0.12 | 0.003 | 0.004 | 0.001 | 0.03 | 0.0038 | 0.0035 |
| 8 | " | 0.10 | 0.40 | 0.90 | 0.004 | 0.004 | 6.49 | 0.80 | 0.40 | 0.13 | 0.003 | 0.004 | 0.001 | 0.04 | 0.0040 | 0.0040 |
| 9 | Other than present invention | 0.10 | 0.40 | 1.10 | 0.005 | 0.002 | 6.4 | 1.24 | 0.50 | 0.12 | 0.001 | 0.004 | 0.001 | 0.03 | 0.0040 | 0.0028 |

What is claimed is:

1. A high strength and high toughness steel welding material which has been modified by subjecting a welding portion welded with said welding material to quenching and annealing said welding material consisting essentially of: C: 0.05–0.15%, Si: 0.25–0.70%, Mn: 0.60–1.80%, Cu: an effective amount up to 0.20%, Ni: 4.5–11.0%, Cr: 0.20–1.20%, Mo: 0.20–0.60%, Ti: 0.03–0.12%, and the balance being substantially iron and wherein the Cr+Mo is from 0.40% to $0.030 \times (Ni\%)^2$ by weight, said welding material having a yield strength ranging from 75–100 Kgf/mm² and having a low temperature durability of over 28 kg/mm² at −90° C.

* * * * *